Nov. 15, 1960  H. E. SCHULZE  2,960,295
SIMPLIFIED AIRCRAFT BOOM CONTROL MECHANISM
Filed Sept. 11, 1956  3 Sheets-Sheet 2
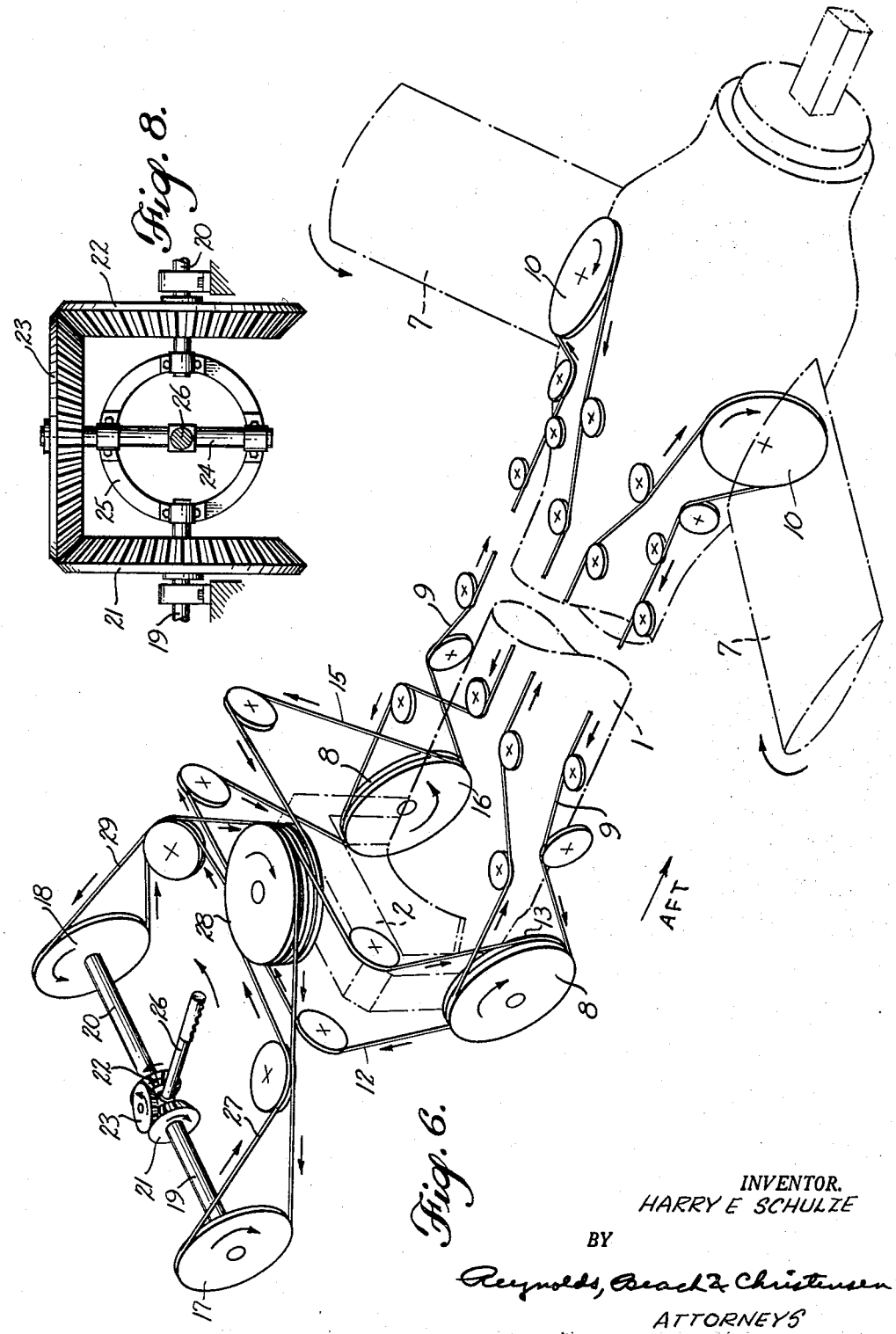
INVENTOR.
HARRY E. SCHULZE
BY
Reynolds, Beach & Christensen
ATTORNEYS Nov. 15, 1960   H. E. SCHULZE   2,960,295
SIMPLIFIED AIRCRAFT BOOM CONTROL MECHANISM
Filed Sept. 11, 1956   3 Sheets-Sheet 3

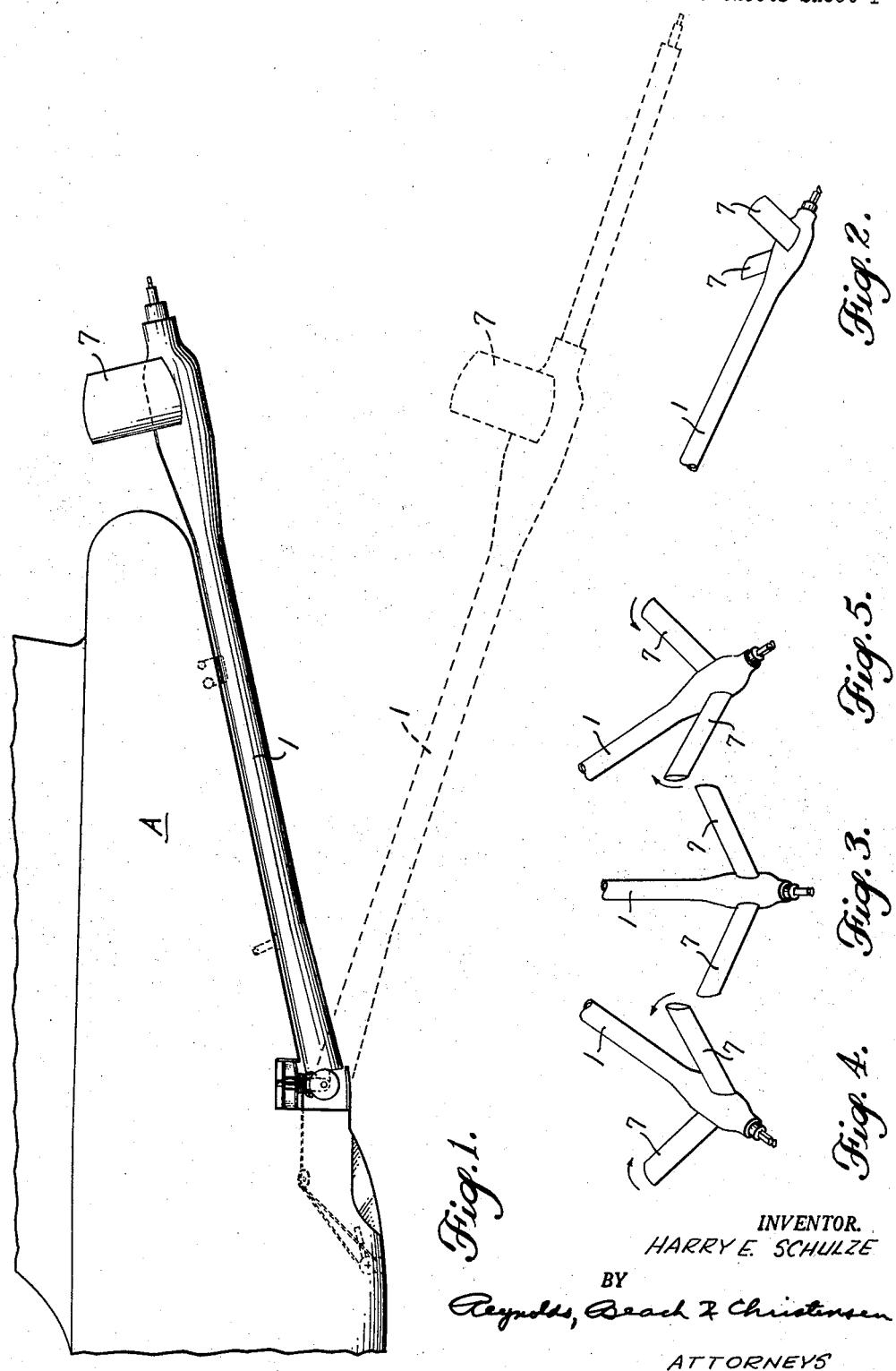

INVENTOR.
HARRY E. SCHULZE
BY
Reynolds, Beach & Christensen
ATTORNEYS

United States Patent Office 2,960,295
Patented Nov. 15, 1960

2,960,295

SIMPLIFIED AIRCRAFT BOOM CONTROL MECHANISM

Harry E. Schulze, Seattle, Wash., assignor to Boeing Airplane Company, Seattle, Wash., a corporation of Delaware Filed Sept. 11, 1956, Ser. No. 609,190

7 Claims. (Cl. 244—135)

Aircraft interconnecting boom installations of the general type to which the present invention relates are shown in Leisy United States Patent No. 2,663,523 and Castor et al. United States Patent No. 2,670,913. The present invention is concerned with a modification of the boom control mechanism disclosed in the latter patent.

The principal object of the present invention is to provide control mechanism for an aircraft interconnecting boom which will accomplish the same general type of control as the mechanism of Patent No. 2,670,913 aforesaid, but which will be of much simpler construction.

More specifically, it is an object to reduce appreciably the number of pulleys, gears and belts utilized in the control mechanism while preserving the same control functions. An additional object is to simplify the boom-supporting structure.

A companion object resulting from the aforesaid simplification is to provide control mehcanism which is less expensive, easier to install, and less inclined to develop trouble in operation. Such control mechanism is also lighter and more compact.

The objects mentioned above can be accomplished by utilizing belt and pulley mechanism interconnecting a control stick and boom swinging mechanism, which incorporates pulleys mounted on the boom-supporting yoke, but rotatable relative to the yoke about the same upright axis around which the yoke turns. The belt and pulley interconnecting mechanism then includes port and starboard pulleys spaced transversely of the aircraft and rotatable about a common axis extending transversely of the aircraft adjacent to the control stick, and port and starboard pulleys mounted respectively on opposite legs of the boom-supporting yoke and rotatable about a common axis extending transversely of the airplane. Cross connecting belts interconnect the port pulley adjacent to the control stick with the starboard pulley on the yoke and the starboard pulley adjacent to the control stick with the port pulley on the yoke through the pulleys rotatable about the upright axis around which the yoke turns.

Figure 1 is a side elevation view of an aircraft boom installation on the tail of an airplane with the boom in retracted position.

Figure 2 is a side perspective view of the trailing portion of a boom in lowered position.

Figure 3 is a rear elevation view of the end portion of such a boom in lowered position when centered, Figure 4 is a similar view with the trailing end of the boom swung to port, and Figure 5 is a similar view with the trailing end of the boom swung to starboard from central position.

Figure 6 is a top perspective view looking forward of the boom control rigging shown diagrammatically.

Figure 8 is a vertical sectional view showing differential gearing mechanism adjacent to a control stick.

Figure 9:
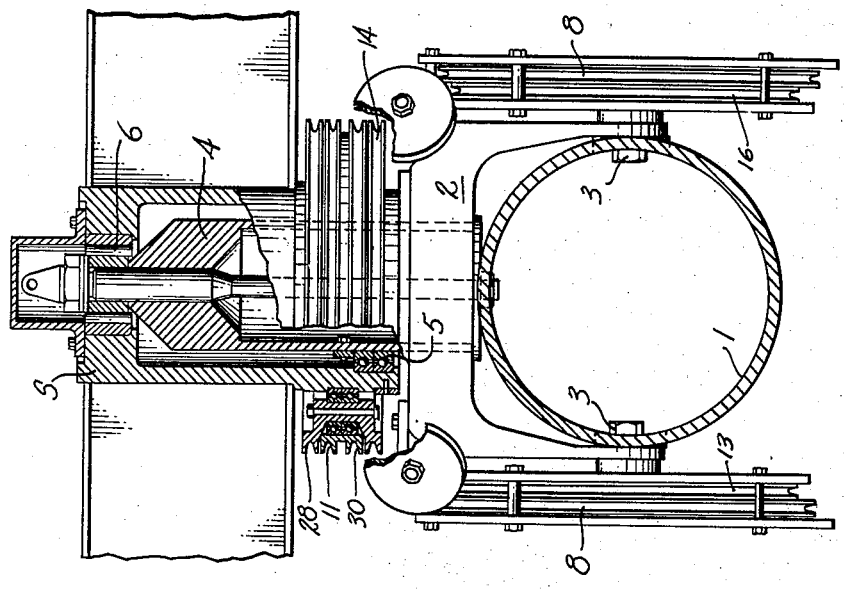
Figure 9 is an elevation view of the boom-supporting yoke and associated elements of the control mechanism with parts broken away.

The general type of boom installation and control mechanism as shown in Figures 1 to 5, inclusive, is similar to the boom and control mechanism shown in Figures 1 to 8, inclusive, of the Castor et al. United States Patent No. 2,670,913 mentioned above. The boom 1 is supported by the yoke 2 for elevational swinging by trunnions 3 mounted in the legs of the yoke about an axis extending transversely of the airplane A. This yoke has an upwardly projecting shank 4, which is mounted in bearings 5 and 6, preferably of anti-friction type, for rotation relative to the airplane's structure S about an upright axis. Such structure is shown as a cup opening downward to receive the shank 4 of the yoke projecting upwardly into it.

It will be evident that the trailing end of the boom 1 may swing in elevation about the trunnions 3 and may swing transversely or yaw as the shank 4 of the yoke rotates in its socket. Control of such movements of the boom can be effected by swinging relative to the boom aerodynamic control surfaces mounted near its trailing end. These surfaces are shown as ruddevators 7 projecting generally laterally from the boom, but upwardly and outwardly inclined to form a large dihedral angle between them. If the surfaces are rotated conjointly clockwise, as seen in Figures 1 and 2, to increase their angles of attack, the trailing end of the boom will be swung upward. Conversely, if both ruddevators are rotated counterclockwise relative to the boom, their angles of attack will be decreased and the trailing end of the boom will be depressed.

Lateral swinging of the boom may be effected by rotating the ruddevators 7 differentially. Thus, as seen in Figure 3, if the angle of attack of the starboard ruddevator is increased and the angle of attack of the port ruddevator is decreased, the resulting aerodynamic forces will swing the trailing end of the boom 1 to port. If both ruddevators are rotated in the opposite directions, as indicated in Figure 5, the trailing end of the boom will be swung to starboard, as shown in that figure. Control mechanism is provided for intentionally changing the angle of attack of the ruddevators for the purpose of changing its elevation, or causing the boom to yaw, in making contact of the trailing end of the boom with another aircraft. Such contact is facilitated by making the boom of telescopic construction, as indicated in broken lines in Figure 1.

It is desirable for the ruddevator control mechanism to be of a character which will maintain a given angular relationship between the ruddevators and the boom irrespective of the position of the boom as well as irrespective of whether the boom's trailing end is connected to another aircraft. Moreover, it is desirable for the relationship between the ruddevators and the boom to be maintained constant when the boom is moved by application of some external force to it, such as a gust of wind or shifting of an airplane to which it is connected with respect to the aircraft on which the boom is mounted. When the boom is thus displaced, therefore, the ruddevators will exert no force on the boom tending to restore it to its previous position, unless the manual control is moved to effect such restoration. Alternatively, it may be desirable for the control mechanism to effect some movement of the ruddevators by swinging of the boom, which will be of a character tending to restore the boom to its previous position.

The mechanism for controlling the attitude of the ruddevators 7 relative to the boom 1 as the boom swings while the voluntary control mechanism remains stationary, whether such swinging is effected by initial control movement of the ruddevators relative to the boom, or by a gust of wind, or by movement of an airplane to which the boom is connected, is shown in Figure 6. Such mechanism includes the port and starboard pulleys 8, mounted rotatively on the opposite legs of the yoke 2 to turn about the same axis extending transversely of the aircraft. These pulleys are connected by belts 9 to pulleys 10, respectively, which are secured to axles of the corresponding ruddevators 7, or otherwise operatively connected to such ruddevators to tilt them for changing their angles of attack by rotation of the pulleys 10.

If the pulleys 8 and 10 are of the same size, they will act as parallel linkage mechanism when connected by the belts 9, even though, as shown, such belts are suitably guided along the boom 1 by any appropriate number of guide pulleys. As the trailing end of the boom is depressed, the belts will be wound to a greater extent onto the upper sides of the pulleys 8 if held by belts 12 and 15 against rotation and correspondingly unwound from their lower sides. Such movement effectively shortens the upper stretches of the belts 9 to rotate both pulleys 10 in a direction to turn the leading edges of the ruddevators downward relative to the boom and maintain substantially their same angle of attack relative to the airstream. Conversely, if the trailing end of the boom should be raised, the belts 9 would be wound onto the lower portions of pulleys 8 and correspondingly unwound from their upper portions to shorten the lower stretches of belts 9 and turn pulleys 10 in a direction to raise the leading edges of the ruddevators relative to the boom. Again, therefore, the angle of attack of the ruddevators would be maintained substantially constant.

Figure 7:
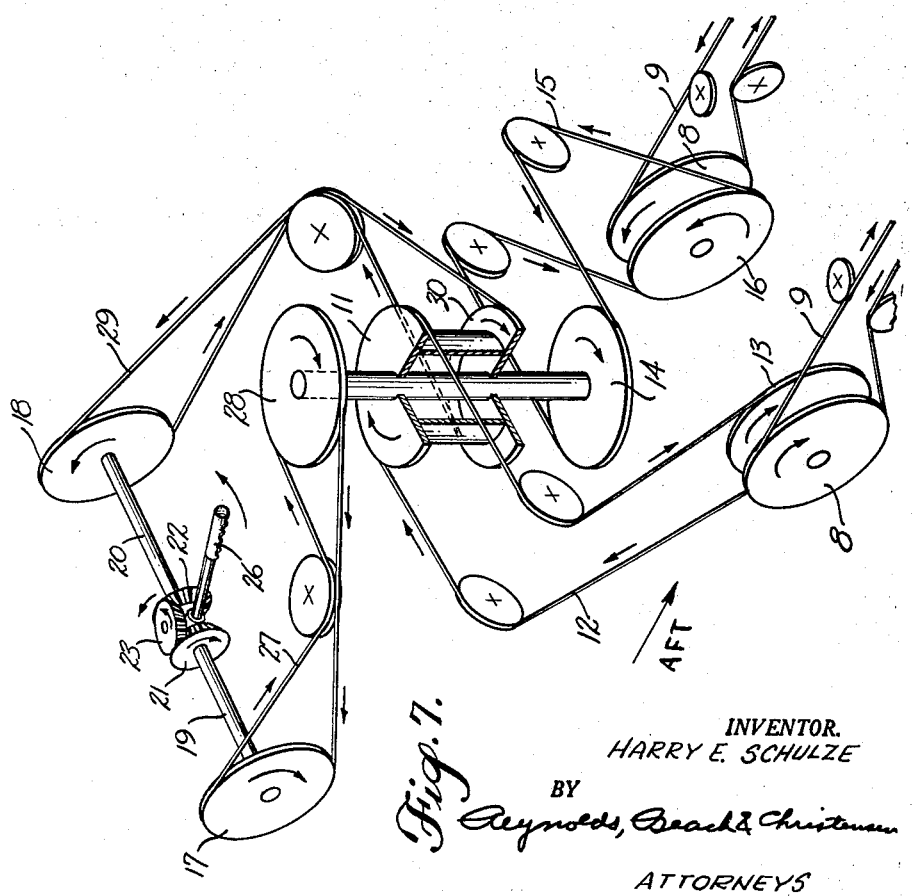
Figure 7 is a similar view of the forward portion of such rigging shown even more diagramamtically with parts in exploded relationship.

If the boom's trailing end should be swung to port, as illustrated in Figure 4, a balancing action would be effected by the mechanism shown most clearly in Figure 7, acting through the pulleys 8, the belts 9, and the pulleys 10. While the rigging, including pulleys 8, belts 9 and pulleys 10, which effect a balancing action in the manner described as the trailing end of the boom moves up or down, is the same as that illustrated in Figure 11 of the Castor et al. Patent No. 2,670,913, the additional mechanism for controlling the pulleys 8 as the boom yaws is different from that disclosed in such prior patent. This improved mechanism includes the pulley 11, connected by the belt 12 to pulley 13 secured to the port pulley 8 for conjoint rotation therewith, and the pulley 14 connected by belt 15 to the pulley 16, which is secured to the starboard pulley 8 for conjoint rotation therewith.

It will be noted that the pulleys 11 and 14 are rotatable about a common axis, which is also the axis about which the yoke 2 turns, as indicated in Figures 6 and 9. Since such axis is upright if the pulleys 11 and 14 are held stationary as the trailing end of the boom 1 swings to port, such as from the position of Figure 3 to that of Figure 4, the belt 12 will be wound onto the aft side of the pulley 11 and correspondingly unwound from its forward side. Such winding movement will effectively shorten the aft stretch of belt 12 extending from the aft side of pulley 11 to rotate pulley 13 in the counterclockwise direction, as seen in Figures 6 and 7. Such rotation of pulley 13 will effect corresponding rotation of pulley 8, which, in turn, will rotate the port pulley 10 counterclockwise as seen in Figure 6 and depress the leading edge of the port ruddevator, projecting from the boom on the port side of the airplane, as indicated in Figure 4.

During such movement of the belt 12, pulley 13 and port pulleys 8 and 10, precisely the opposite movement will be effected of the rigging on the starboard side of the boom. Thus, as the trailing end of the boom swings to port, the belt 15 will be unwound from the aft side of pulley 14 and wound onto the forward side of that pulley. By this movement, the aft stretch of belt 15 extending from the aft side of pulley 14 will be effectively lengthened, and the forward stretch of belt 15 extending from the forward side of pulley 14 will be shortened to cause pulley 16 to rotate in the clockwise direction as seen in Figure 6. The starboard pulley 8 will be turned correspondingly which, by movement of belt 9, will effect rotation of the starboard pulley 10 in a direction to increase the angle of attack of the starboard ruddevator 7, projecting from the boom on the starboard side of the airplane, as indicated by the arrow in Figure 4. As the trailing end of the boom swings to port, therefore, the pulley and belt rigging described will cause the leading edge of the port ruddevator projecting from the boom on the port side of the airplane to be depressed and the leading edge of the starboard ruddevator projecting from the boom on the starboard side of the airplane to be raised correspondingly. Again, the degree of such ruddevator tilting will depend upon the relatively sizes of the pulleys 8 and 10, but such movement will tend to move the ruddevators so that they will exert no force, or at least a reduced force, tending to restore the boom to its central position of Figure 3.

Conversely, if the trailing end of the boom should be swung to starboard for any reason, such as from the position of Figure 3 to that of Figure 5 and the pulleys 11 and 14 remain stationary, the belts 12 and 15 would wind in the opposite directions, respectively, on their pulleys 11 and 14. Such winding would result in the port pulley 8 being turned clockwise, and the starboard pulley 8 being turned correspondingly counterclockwise to increase the angle of attack of the port ruddevator projecting from the boom on the port side of the airplane, and decrease the angle of attack of the starboard ruddevator projecting from the starboard side of the airplane to the same extent, as indicated by the arrows in Figure 5. Again, therefore, the effect on boom 1 of such differential ruddevator movement would be to avoid, or at least to reduce, the production of an aerodynamic force tending to swing the boom to port into its central position again.

Not only is the structure of the present invention for automatically moving the ruddevators in balancing fashion as the boom yaws simplified over the structure used for this purpose as disclosed in Castor et al. Patent No. 2,670,913, but the voluntary control mechanism operable to manipulate the ruddevators is also considerably simplified. Such voluntary control mechanism is connected to rotate the pulleys 11 and 14, and the nature of such voluntary control mechanism is shown most clearly in the exploded diagrammatic view of Figure 7. Such voluntary control mechanism includes a port pulley 17 and a starboard pulley 18, which are spaced transversely of the aircraft and are mounted to rotate about a common axis extending transversely of the aircraft. These pulleys, however, are not secured to a common axle so that they must rotate in synchronism.

On the contrary, these pulleys are mounted respectively on separate shafts 19 and 20 which are independently rotatable, although their rotations are coordinated because such shafts are interconnected by differential gearing. Such gearing includes a bevel gear 21, carried by shaft 19, a corresponding bevel gear 22, carried by shaft 20, and a bevel gear 23 meshing with the bevel gears 20 and 21, and rotatable about an axis perpendicular to shafts 19 and 20. As shown best in Figure 8, however, the rotative axes of gears 21, 22 and 23 are all in the same plane and the axle 24 for gear 23, as well as the axles 19 and 20, may all be journaled in bearings mounted on an interconnecting or common mounting ring 25. The axle 24 of gear 23 extends diametrically across this ring, and carries at the center of the ring a mounting for a control stick 26.

The pulleys 17 and 18 are cross connected through pulleys 11 and 14 to pulleys 13 and 16. Thus, port pulley 17 is operatively connected to starboard pulley 16 by belt 27, rotatively connecting pulley 17 with pulley 28, which is integrally connected with pulley 14 for rotation with it, and this latter pulley is connected to pulley 16 by belt 15, as previously explained. Conversely, starboard pulley 18 is operatively connected to port pulley 13 by belt 29, which connects pulley 18 rotatively to pulley 30, which latter pulley is rotatively integral with pulley 11, and this pulley is connected to pulley 13 by belt 12, as previously explained. The structural integration of pulley 28 with pulley 14 and the integration of pulley 30 with pulley 11 are shown in Figure 9.

As long as the control stick 26 is held stationary, the pulleys 11 and 14 will be held stationary because of their interconnection respectively with pulleys 30 and 28, which are immobilized through the gearing, axle, belt, and pulley connections to the stick 26. As long as pulleys 11 and 14 are thus held stationary, movements of the boom, whether elevationally or in yaw, will be substantially balanced automatically, as discussed above. The voluntary control mechanism, however, enables the pulleys 11 and 14 to be rotated for superimposing upon the automatic balancing rigging a movement which will effect changes in the angles of attack of the ruddevators 7 for the purpose of moving the boom's trailing end intentionally, either in elevation or in yaw, for the purpose of making contact with another aircraft, or moving the boom into the stored position shown in solid lines in Figure 1.

In order to effect such voluntary control movement of the pulleys 11 and 14 by rotation of the pulleys 30 and 28, respectively, suitable guide pulleys for belt 27 are interposed between pulley 17 and pulley 28 to transform the rotative movement of pulley 17 about a horizontal axis into rotation of pulley 28 about a vertical axis. Similarly, suitable guide pulleys for belt 29 are interposed between pulley 18 and pulley 30 for transforming the rotation of pulley 18 about a horizontal axis into corresponding rotation of pulley 30 about an upright axis. The sizes of pulleys 17 and 18 relative to the sizes of pulleys 28 and 30 may be selected to afford the desired movement relationship between these pulleys. Similarly, the size of interconnecting gear 23 may be selected relative to the size of gears 21 and 22 to effect the desired movement ratio between the swinging of control stick 26 and the rotation of pulleys 17 and 18.

A typical type of control operation to effect yawing movement of the trailing end of boom 1 is indicated by the arrows in Figures 6 and 7. The trailing end of the control stick 26 is swung to starboard for the purpose of effecting swinging of the trailing end of the boom 1 to starboard. Such swinging of the control stick effects rotation of gear 23 to turn gear 21 clockwise and gear 22 counterclockwise. Correspondingly, pulley 17 will be turned clockwise and pulley 18 will be turned counterclockwise. Such pulley rotation, in turn, will rotate pulleys 28 and 14 in a clockwise direction looking downward, and pulleys 30 and 11 also will be turned clockwise looking downward. By such rotation of pulleys 30 and 11 the port pulleys 8 and 13 will be turned clockwise as viewed from the port side, but the starboard pulleys 16 and 18 will be rotated counterclockwise as viewed from the port side. By the belts 9 connecting pulleys 8 to pulleys 10 clockwise rotation of the port pulley will increase the angle of attack of the port ruddevator, while counterclockwise rotation of the starboard pulley 8 will reduce the angle of attack of the starboard ruddevator. The aerodynamic forces resulting from such change in angles of attack of the ruddevators will swing the trailing end of the boom toward the starboard position of Figure 5.

During such swinging of the trailing end of boom 1 toward starboard, the pulleys 8 will be rotated not only as a result of the rotation of pulleys 11 and 14 effected by the voluntary control rotation of pulleys 30 and 28, but such movement of the boom will also wind the forward stretch of belt 12 onto pulley 11, and unwind the aft stretch of this belt from such pulley. Consequently, pulley 13 and port pulley 8 will be turned to a greater extent in the clockwise direction by reason of the boom's trailing end swinging to port than would be effected simply by the rotation of pulley 11 alone. Similarly, the rotation of pulley 14 effected by turning of pulley 28 will be supplemented as the trailing end of the boom swings to starboard by winding of the aft stretch of belt 15 onto pulley 14 and unwinding of the forward stretch of such belt from that pulley. Pulley 16 and the starboard pulley 8 will therefore be rotated farther in the counterclockwise direction than would be occasioned simply by a given turning of pulley 14.

As the trailing end of the boom 1 swings to starboard, therefore, the angle of attack of the port ruddevator will be increased, and the angle of attack of the starboard ruddevator will be decreased more than would be effected simply by the movement of the control stick 26. As a result, the boom is not only swung to starboard by such control movement, but tends to remain in the swung position thus established even though the control stick is returned to its central position. The boom operator, therefore, need not be concerned about moving the stick 26 an amount to effect a given displacement of the boom, and then continue to hold the stick in that position, but the operator may displace the stick and hold it in such displaced position until the boom has swung into the desired position, and then return the control stick to its central position while the boom will remain in such displaced position. The degree of swinging of the control stick does not, therefore, determine the degree of swinging of the boom, but only controls the speed with which the boom is swung.

It is believed to be unnecessary to describe in detail the movement of the various rigging components effected for each movement of the control stick to accomplish swinging of the boom. It may be stated generally, however, that upward movement of the trailing end of the control stick will cause gear 23 to turn both gears 21 and 22 in the same direction and to the same degree which will result in raising the trailing end of the boom. Conversely, downward movement of the trailing end of the stick will cause gear 23 to rotate both gears 21 and 22 to the same degree in the clockwise direction, resulting in downward movement of the trailing end of the boom. Swinging of the trailing end of the boom to starboard has been described in detail as a result of swinging the trailing end of the stick to starboard, and conversely swinging of the trailing end of the stick to port will result in the trailing end of the boom being swung to port. The control stick's trailing end is universely movable, so that if it is swung both downward and to port, for example, the trailing end of the boom also will be swung downward and toward the port side. In whatever direction and to whatever extent the trailing end of the control stick is swung to effect corresponding movement of the trailing end of the boom, return of the trailing end of the control stick to its central position both elevationally and transversely of the aircraft will result in the boom being stabilized in whatever position of adjustment it may be, if the gears and pulleys of the rigging are proportioned properly to affording balancing movement of the ruddevators as the boom is displaced from a position aligned with the direction of flight.

I claim as my invention:

1. Mechanism on an aircraft for interconnecting aircraft in flight, comprising a yoke mounted on the aircraft for rotation of said yoke about an upright axis, a boom having its forward portion pivoted on said yoke to swing relative thereto about an axis extending transversely of such upright axis, boom-swinging means carried by and movable relative to said boom and operatively connected to said boom to effect swinging thereof by movement of said boom-swinging means relative to said boom, pulley means concentric with the upright axis of said yoke, said yoke and said pulley means being relatively rotatable, and belt means interconnecting said pulley means and said boom-swinging means for moving said boom-swinging means relative to said boom by swinging of said boom and rotation of said yoke about such upright axis relative to said pulley means.

2. Mechanism on an aircraft for interconnecting aircraft in flight, comprising a yoke mounted on the aircraft for rotation of said yoke about an upright axis, a boom having its forward portion pivoted on said yoke to swing relative thereto about an axis extending transversely of such upright axis, boom-swinging means carried by and movable relative to said boom and operatively connected to said boom to effect swinging thereof by movement of said boom-swinging means relative to said boom, voluntary control means, and means interconnecting said vountary control means and said boom-swinging means including pulley means concentric with and rotatable relative to said yoke about the upright axis of said yoke, means interconnecting said voluntary control means and said pulley means, said yoke and said pulley means being relatively rotatable, and belt means interconnecting said pulley means and said boom-swinging means for moving said boom-swinging means relative to said boom by swinging of said boom and rotation of said yoke about such upright axis relative to said pulley means.

3. Mechanism on an aircraft for interconnecting aircraft in flight, comprising a yoke mounted on the aircraft for rotation of said yoke about an upright axis and rotatable freely about such axis, a boom having its forward portion pivoted on said yoke to swing about an axis extending transversely of such upright axis, first pulley means concentric with such upright axis, second pulley means mounted on said yoke and rotatable relative thereto, boom-swinging means carried by said boom, operatively connected to said boom to effect swinging thereof by movement of said boom-swinging means relative to said boom and operatively connected to said second pulley means, and belt means interconnecting said first pulley means and said second pulley means for rotating said second pulley means relative to said yoke by swinging of said boom and rotation of said yoke about such upright axis relative to said first pulley means and moving said boom-swinging means correspondingly.

4. Mechanism on an aircraft for interconnecting aircraft in flight, comprising a yoke mounted on the aircraft for rotation of said yoke about an upright axis and including two legs spaced transversely of such aircraft, a boom having its forward portion pivoted on said yoke to swing relative thereto about an axis extending transversely of such upright axis, first pulley means concentric with and rotatable relative to said yoke about such upright axis, boom-swinging means carried by and movable relative to said boom, second pulley means having two pulleys pivotally mounted, respectively, one on each of the two legs of said yoke, spaced transversely of the aircraft and operatively connected to said boom-swinging means to effect swinging of said boom by movement of said boom-swinging means relative to said boom, voluntary control means, third pulley means having two pulleys mounted adjacent to said voluntary control means and connected thereto for rotation thereby about a common axis extending transversely of the aircraft, belt means interconnecting said first pulley means and said third pulley means for transmitting rotation therebetween, and belt means interconnecting said first pulley means and said second pulley means for rotating said second pulley means relative to said yoke by swinging of said boom and rotation of said yoke about such upright axis relative to said first pulley means and moving said boom-swinging means correspondingly.

5. Mechanism on an aircraft for interconnecting aircraft in flight, comprising a yoke mounted on the aircraft for rotation of said yoke about an upright axis and including two legs spaced transversely of such aircraft, a boom having its forward portion pivoted on said yoke to swing relative thereto about an axis extending transversely of such upright axis, first pulley means including a plurality of pulley devices concentric with such upright axis, boom-swinging means carried by and movable relative to said boom, second pulley means having port and starboard pulleys pivotally mounted, respectively, on the two legs of said yoke, spaced transversely of the aircraft and operatively connected to said boom-swinging means to effect swinging of said boom by movement of said boom-swinging means relative to said boom by rotation of said pulleys of said second pulley means relative to said yoke, voluntary control means, third pulley means having port and starboard pulleys mounted adjacent to said voluntary control means and connected thereto for rotation thereby about a common axis extending transversely of the aircraft, belt means connecting a pulley device of said first pulley means to the port pulley of said third pulley means and to the starboard pulley of said second pulley means, and belt means connecting another pulley device of said first pulley means to the starboard pulley of said third pulley means and to the port pulley of said second pulley means.

6. The mechanism defined in claim 5, in which one pulley device of the first pulley means is rotatably mounted on another pulley device of the first pulley means.

7. The mechanism defined in claim 5, in which one pulley device of the first pulley means includes a first pair of conjointly rotating pulleys, one pulley of such pair being connected to the port pulley of the third pulley means and the other pulley of such pair being connected to the starboard pulley of the second pulley means, and another pulley device of the first pulley means including a second pair of conjointly rotating pulleys, one pulley of such second pair being connected to the starboard pulley of the third pulley means, and the other pulley of such second pair being connected to the port pulley of the second pulley means.

References Cited in the file of this patent

UNITED STATES PATENTS 2,670,913    Castor et al. _____ Mar. 2, 1954